(12) United States Patent
Salinas

(10) Patent No.: US 10,351,053 B1
(45) Date of Patent: Jul. 16, 2019

(54) AUXILIARY TURN LIGHTS FOR A TRACTOR TRAILER

(71) Applicant: Derek Salinas, Erie, CO (US)

(72) Inventor: Derek Salinas, Erie, CO (US)

( * ) Notice: Subject to any disclaimer, the term of this patent is extended or adjusted under 35 U.S.C. 154(b) by 0 days.

(21) Appl. No.: 15/919,275

(22) Filed: Mar. 13, 2018

(51) Int. Cl.
*H05B 33/00* (2006.01)
*B60Q 1/32* (2006.01)
*B60Q 1/24* (2006.01)
*B60Q 1/26* (2006.01)
*B60Q 1/38* (2006.01)
*B60Q 1/30* (2006.01)

(52) U.S. Cl.
CPC ............... *B60Q 1/32* (2013.01); *B60Q 1/24* (2013.01); *B60Q 1/2607* (2013.01); *B60Q 1/2696* (2013.01); *B60Q 1/30* (2013.01); *B60Q 1/382* (2013.01); *B60Y 2200/148* (2013.01)

(58) Field of Classification Search
CPC .. F21V 31/04; F21V 21/00; B60P 3/34; B60P 3/341; B60P 3/42; B60P 3/07; B60P 3/122; B60P 3/38; H05B 37/03; H05B 33/0887; H05B 37/00; H05B 33/0812; H05B 33/089
See application file for complete search history.

(56) References Cited

U.S. PATENT DOCUMENTS

| | | |
|---|---|---|
| 5,209,559 A | 5/1993 | Ruppel |
| 5,682,138 A | 10/1997 | Powell |
| D422,102 S | 3/2000 | Moore |
| 6,095,663 A | 8/2000 | Pond |
| 6,422,728 B1 | 7/2002 | Riggin |
| 7,048,419 B1 | 5/2006 | Rodriguez |
| 8,770,809 B2 | 7/2014 | Kiser |
| 2003/0107900 A1 | 6/2003 | Ellison |
| 2014/0265840 A1* | 9/2014 | Romberger ........ B60Q 11/005 315/77 |

FOREIGN PATENT DOCUMENTS

WO   2003049972 A   6/2003

* cited by examiner

*Primary Examiner* — Monica C King
(74) *Attorney, Agent, or Firm* — Kyle A. Fletcher, Esq.

(57) ABSTRACT

The auxiliary turn light for a tractor-trailer is an illumination system. The tractor-trailer further comprises a left turn control signal and a right turn control signal. The left turn control signal and the right turn control signal generates an electrical signal that operates the left turn signal and the right turn signal respectively. The auxiliary turn light for a tractor-trailer comprises a left illumination circuit and a right illumination circuit. The left illumination circuit operates a left lamp that generates a field of illumination on the left side of the tractor. The right illumination circuit operates a right lamp that generates a field of illumination on the right side of the tractor. The operation of the left illumination circuit is initiated by the left turn control signal. The operation of the right illumination circuit is initiated by the right turn control signal.

17 Claims, 4 Drawing Sheets

AUXILIARY TURN LIGHTS FOR A TRACTOR TRAILER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of vehicles including signaling and lighting devices for vehicles, more specifically, a clearance light for a trailer.

SUMMARY OF INVENTION

The auxiliary turn lights for a tractor-trailer is an illumination system. The auxiliary turn light for a tractor-trailer is configured for use with a trailer. The trailer further comprises a left turn signal and a right turn signal. The trailer is further defined with a left side and a right side. The trailer is configured for use with a tractor. The tractor further comprises an electrical power system, a left turn control signal, and a right turn control signal. The left turn control signal generates an electrical signal that operates the left turn signal. The right turn control signal generates an electrical signal that operates the right turn signal. The auxiliary turn light for a tractor-trailer comprises a left illumination circuit and a right illumination circuit. The left illumination circuit operates a left lamp that generates a field of illumination on the left side of the tractor. The right illumination circuit operates a right lamp that generates a field of illumination on the right side of the tractor. The operation of the left illumination circuit is initiated by the left turn control signal. The operation of the right illumination circuit is initiated by the right turn control signal.

These together with additional objects, features and advantages of the auxiliary turn lights for a tractor-trailer will be readily apparent to those of ordinary skill in the art upon reading the following detailed description of the presently preferred, but nonetheless illustrative, embodiments when taken in conjunction with the accompanying drawings.

In this respect, before explaining the current embodiments of the auxiliary turn lights for a tractor-trailer in detail, it is to be understood that the auxiliary turn light for a tractor-trailer is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the auxiliary turn lights for a tractor-trailer.

It is therefore important that the claims be regarded as including such equivalent construction insofar as they do not depart from the spirit and scope of the auxiliary turn lights for a tractor-trailer. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
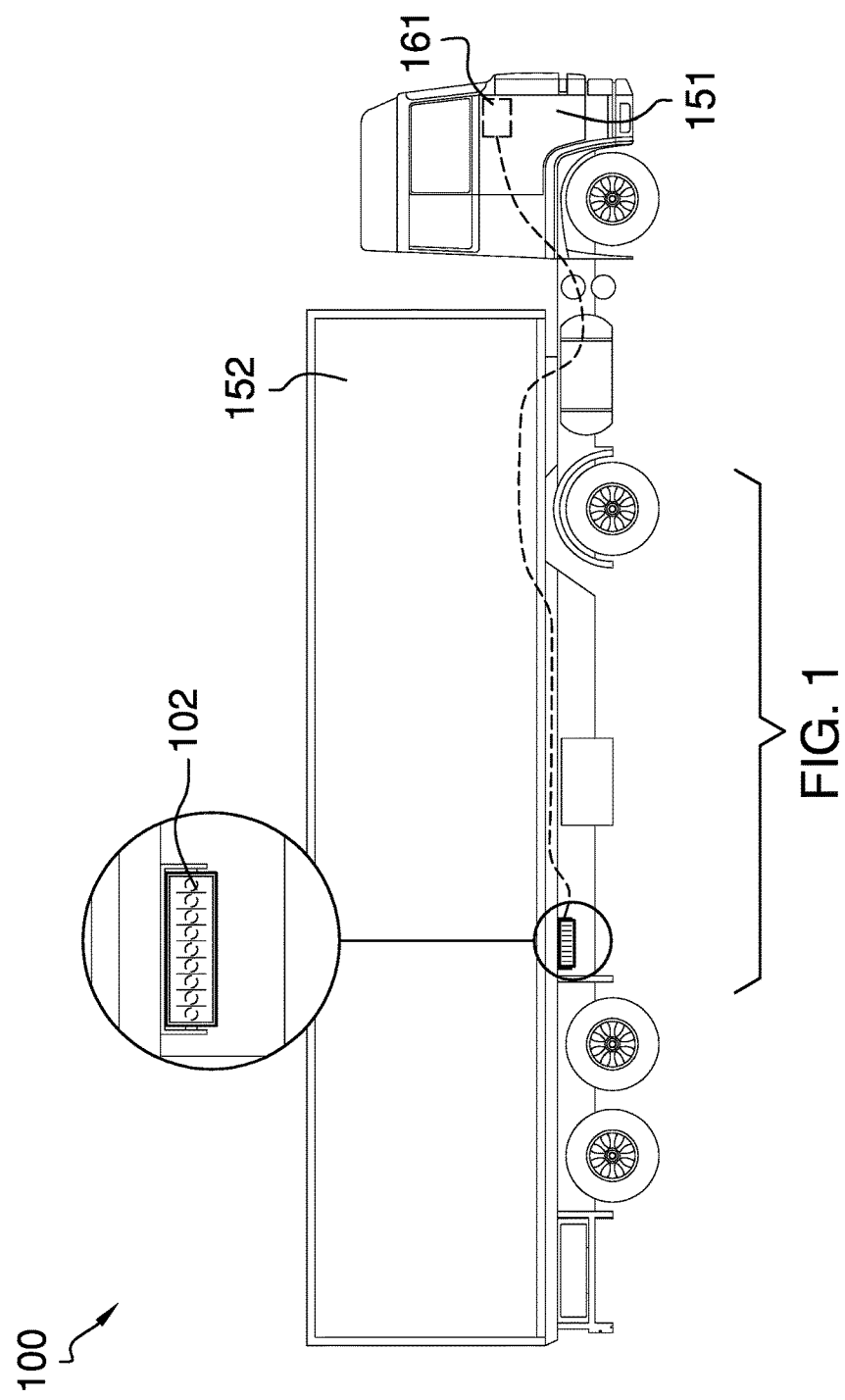
FIG. 1 is a side view of an embodiment of the disclosure.
Figure 2:
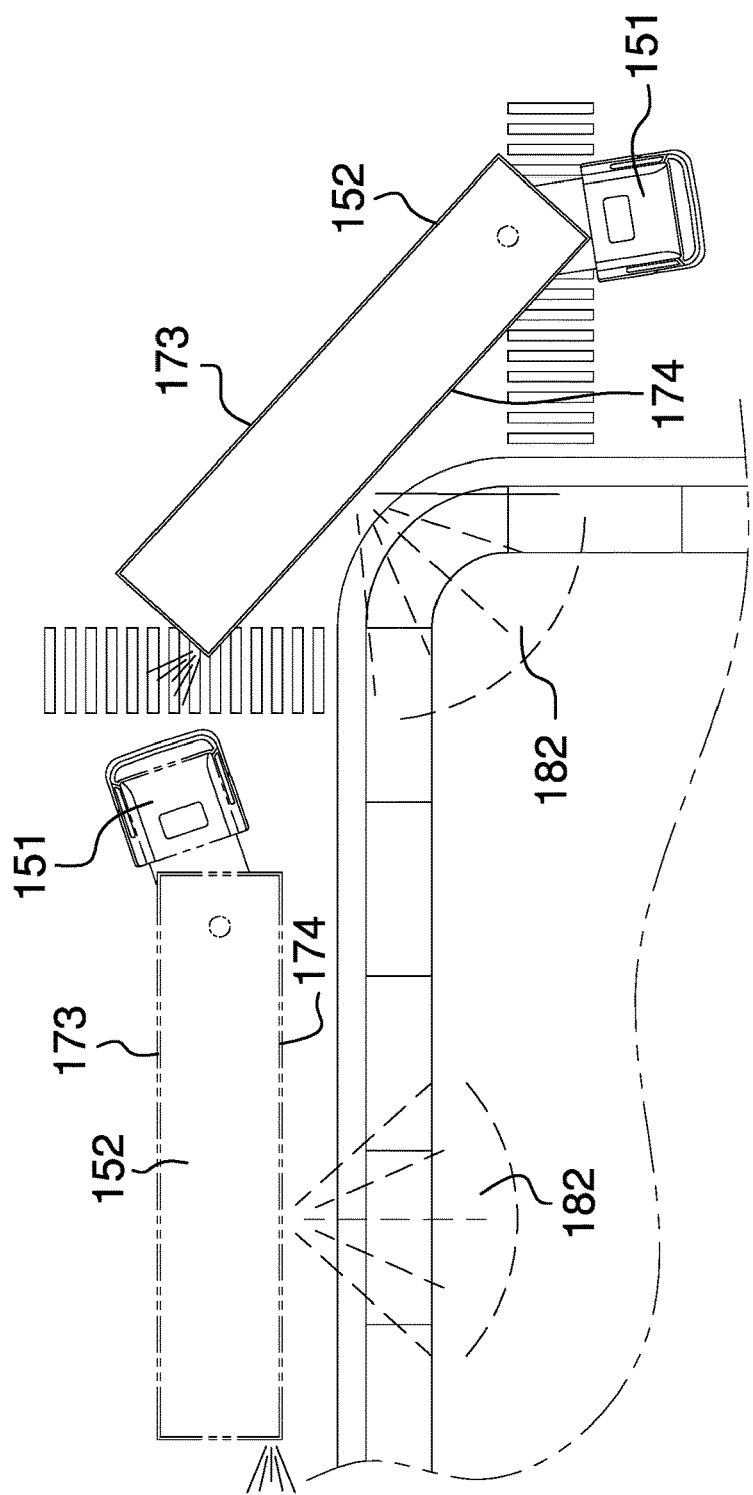
FIG. 2 is a top view of an embodiment of the disclosure.
Figure 3:
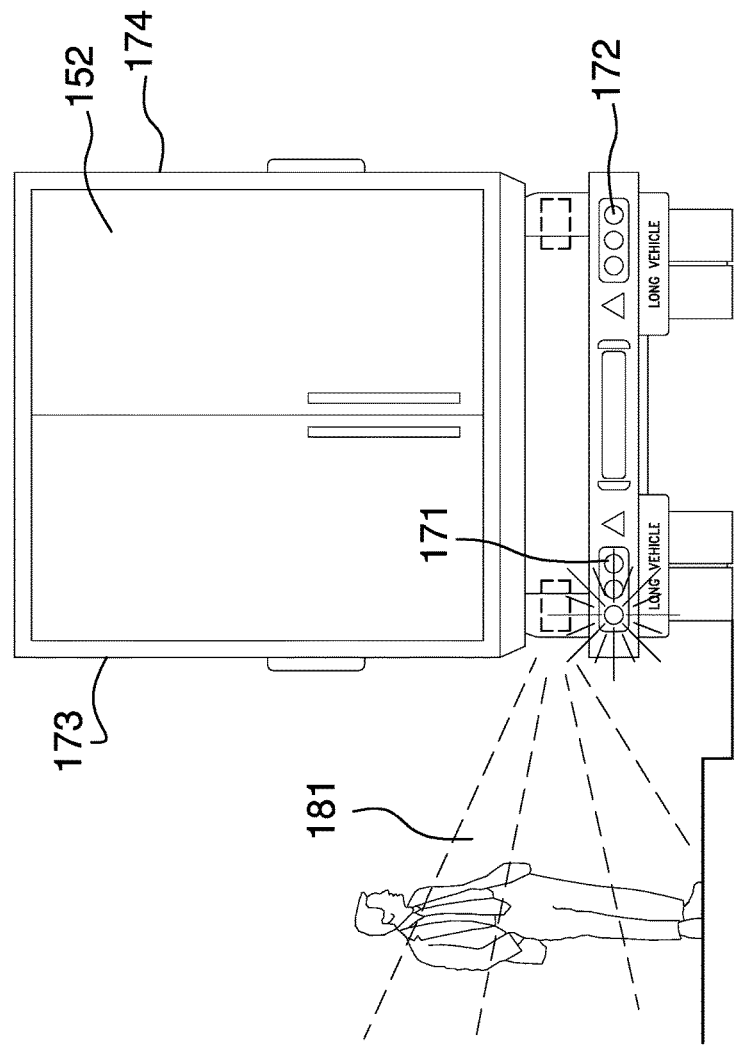
FIG. 3 is a rear view of an embodiment of the disclosure.
Figure 4:
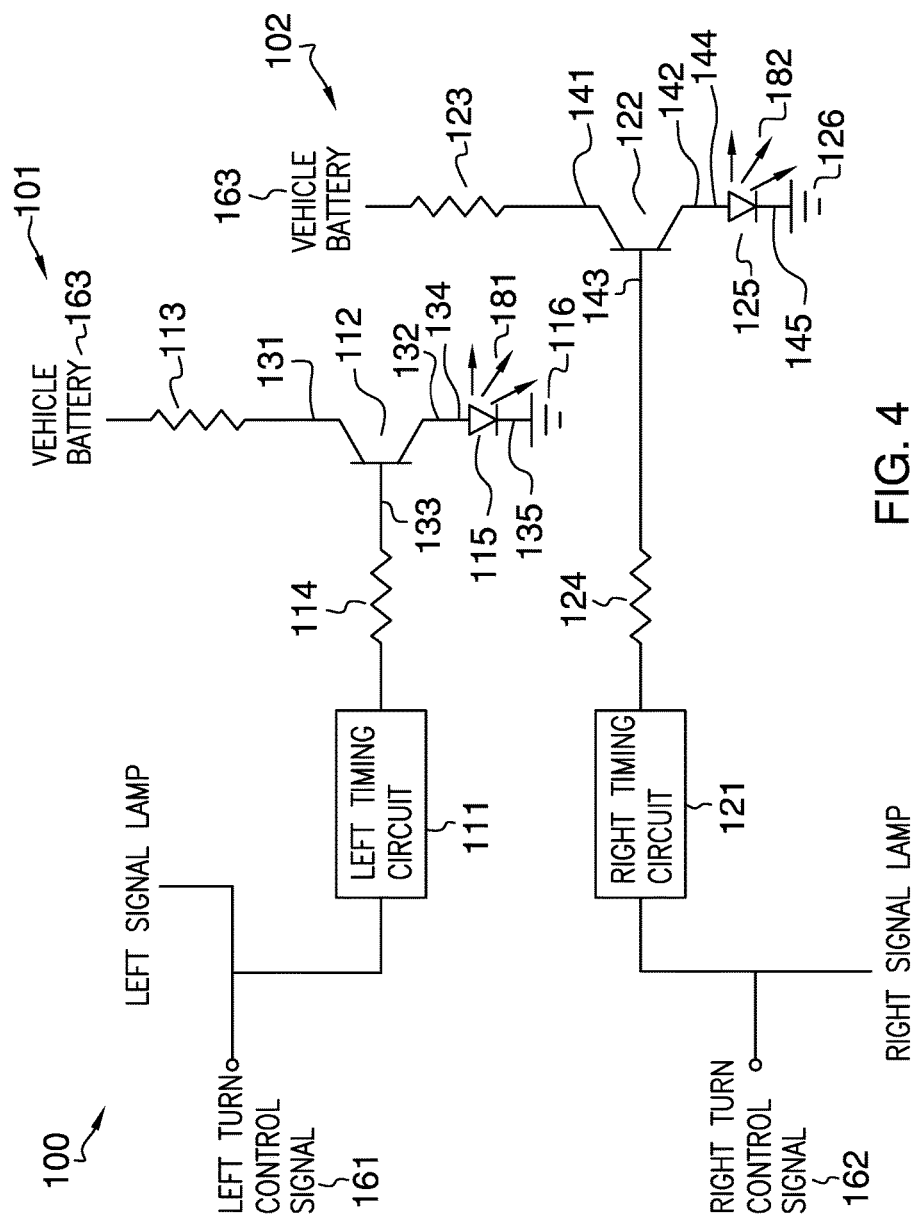
FIG. 4 is a schematic view of an embodiment of the disclosure.

Detailed reference will now be made to one or more potential embodiments of the disclosure, which are illustrated in FIGS. 1 through 4.

The auxiliary turn light for a tractor-trailer 100 (hereinafter invention) is an illumination system. The invention 100 is configured for use with a trailer 152. The trailer 152 further comprises a left turn lamp 171 and a right turn lamp 172. The trailer 152 is further defined with a left side and a right side. The trailer 152 is configured for use with a tractor 151. The tractor 151 further comprises an electrical power system 163, a left turn control signal 161, and a right turn control signal 162. The left turn control signal 161 generates an electrical signal that operates the left turn lamp 171. The right turn control signal 162 generates an electrical signal that operates the right turn lamp 172.

The electrical power system 163 is a direct current power system that is generated by the tractor 151. The left turn lamp 171 is a signaling device used to indicate to those in the vicinity that the driver of the tractor 151-trailer 152 intends to make a left turn. The right turn lamp 172 is a signaling device used to indicate to those in the vicinity that the driver of the tractor 151-trailer 152 intends to make a right turn. The left side 173 refers to the side of the tractor 151-trailer the driver is sitting on. The right side 174 refers to the side of the tractor 151-trailer 152 that is distal from the left side 173.

The invention 100 comprises a left illumination circuit 101 and a right illumination circuit 102. The left illumination circuit 101 operates a left lamp 115 that generates a left field of illumination 181 on the left side of the tractor 151. The right illumination circuit 102 operates a right lamp 125 that generates a right field of illumination 182 on the right side of the tractor 151. The operation of the left illumination circuit 101 is initiated by the left turn control signal 161. The operation of the right illumination circuit 102 is initiated by the right turn control signal 162.

The left illumination circuit 101 is an electrical circuit. The left illumination circuit 101 operates a left lamp 115. The left lamp 115 generates a left field of illumination 181 on the left side 173 of the trailer 152 when the left turn lamp 171 is in operation. The left illumination circuit 101 is a self-contained device that attaches to the left side 173 of the trailer 152. The left illumination circuit 101 receives electrical power from the electrical power system 163 of the tractor 151 that is attached to the trailer 152. The operation of the left illumination circuit 101 is triggered by the left turn control signal 161 from the tractor 151.

The left illumination circuit 101 comprises a left timing circuit 111, a left transistor 112, a left pull-up resistor 113, a left limit resistor 114, the left lamp 115, and a left electric ground 116. The left timing circuit 111, the left transistor 112, the left pull-up resistor 113, the left limit resistor 114, the left lamp 115, and the left electric ground 116 are electrically interconnected. The left transistor 112 is further defined with a left collector 131, a left emitter 132, and a left base 133. The left lamp 115 is further defined with a left anode 134 and a left cathode 135. The left timing circuit 111 is a timing circuit.

The left timing circuit 111 is an electrical circuit that generates an electrical control signal in response to the detection of a triggering signal. In the first potential embodiment of the disclosure, the left timing circuit 111 is triggered by the left turn control signal 161. Upon detection of the left turn control signal 161, the left timing circuit 111 generates an electrical voltage that feeds electric current into the left base 133 of the left transistor 112 for a previously determined amount of time. In the first potential embodiment of the disclosure, the left timing circuit 111 is a well-known and documented "555" circuit.

The left transistor 112 operates as a switch. When a voltage is applied to the left base 133, current will flow into the left base 133 allowing the left transistor 112 to act as a closed switch allowing current to flow from the left collector 131 to the left emitter 132. When the voltage is removed from the left base 133, the left transistor 112 acts as an open switch disrupting current flow from the left collector 131 to the left emitter 132. In the first potential embodiment of the disclosure, the left transistor 112 draws power from the electrical power system 163 of the tractor 151 through the left collector 131.

The left pull-up resistor 113 connects in series between the electrical power system 163 of the tractor 151 and the left collector 131. The left pull-up resistor 113 limits the flow of electricity from the electrical power system 163 of the tractor into the left collector 131 of the left transistor 112.

The left limit resistor 114 is a resistor placed in series between the left timing circuit 111 and the left base 133 of the left transistor 112. The left limit resistor 114 limits the flow of electricity from the left timing circuit 111 into the left base 133 of the left transistor 112.

The left lamp 115 is a two-terminal electrical device that generates light. The left lamp 115 is configured to project light along the left side 173 of the trailer 152. In the first potential embodiment of the disclosure, the left lamp 115 comprises one or more light emitting diodes. The use of light emitting diodes to generate illumination from a vehicle is well-known and documented in the electrical arts. The left anode 134 of the left lamp 115 electrically connects to the left emitter 132 of the left transistor 112. The left cathode 135 of the left lamp 115 electrically connects to the left electric ground 116.

The left electric ground 116 is a voltage reference used in the left illumination circuit 101. The left electric ground 116 is electrically connected to the electrical ground of the electrical power system 163 of the tractor 151.

The right illumination circuit 102 is an electrical circuit. The right illumination circuit 102 operates a right lamp 125. The right lamp 125 generates a right field of illumination 182 on the right side 174 of the trailer 152 when the right turn lamp 172 is in operation. The right illumination circuit 102 is a self-contained device that attaches to the right side 174 of the trailer 152. The right illumination circuit 102 receives electrical power from the electrical power system 163 of the tractor 151 that is attached to the trailer 152. The operation of the right illumination circuit 102 is triggered by the right turn control signal 162 from the tractor 151.

The right illumination circuit 102 comprises a right timing circuit 121, a right transistor 122, a right pull-up resistor 123, a right limit resistor 124, the right lamp 125, and a right electric ground 126. The right timing circuit 121, the right transistor 122, the right pull-up resistor 123, the right limit resistor 124, the right lamp 125, and the right electric ground 126 are electrically interconnected. The right transistor 122 is further defined with a right collector 141, a right emitter 142, and a right base 143. The right lamp 125 is further defined with a right anode 144 and a right cathode 145.

The right timing circuit 121 is a timing circuit. The right timing circuit 121 is an electrical circuit that generates an electrical control signal in response to the detection of a triggering signal. In the first potential embodiment of the disclosure, the right timing circuit 121 is triggered by the right turn control signal 162. Upon detection of the right turn control signal 162, the right timing circuit 121 generates an electrical voltage that feeds electric current into the right base 143 of the right transistor 122 for a previously determined amount of time. In the first potential embodiment of the disclosure, the right timing circuit 121 is a well-known and documented "555" circuit.

The right transistor 122 operates as a switch. When a voltage is applied to the right base 143, current will flow into the right base allowing the right transistor 122 will act as a closed switch allowing current to flow from the right collector 141 to the right emitter 142. When the voltage is removed from the right base 143, the right transistor 122 acts as an open switch disrupting current flow from the right collector 141 to the right emitter 142. In the first potential embodiment of the disclosure, the right transistor 122 draws power from the electrical power system 163 of the tractor 151 through the right collector 141.

The right pull-up resistor 123 connects in series between the electrical power system 163 of the tractor 151 and the right collector 141. The right pull-up resistor 123 limits the flow of electricity from the electrical power system 163 of the tractor 151 into the right collector 141 of the right transistor 122.

The right limit resistor 124 is a resistor placed in series between the right timing circuit 121 and the right base 143 of the right transistor 122. The right limit resistor 124 limits the flow of electricity from the right timing circuit 121 into the right base 143 of the right transistor 122.

The right lamp 125 is a two-terminal electrical device that generates light. The right lamp 125 is configured to project light along the right side 174 of the trailer 152. In the first potential embodiment of the disclosure, the right lamp 125 comprises one or more light emitting diodes. The use of light emitting diodes to generate illumination from a vehicle is well-known and documented in the electrical arts. The right anode 144 of the right lamp 125 electrically connects to the right emitter 142 of the right transistor 122. The right cathode 145 of the right lamp 125 electrically connects to the right electric ground 126.

The right electric ground 126 is a voltage reference used in the right illumination circuit 102. The right electric ground 126 is electrically connected to the electrical ground of the electrical power system 163 of the tractor 151.

The following definitions were used in this disclosure:

Anodes and Cathodes: As used in this disclosure, an anode and a cathode are the connecting terminals of an electrical circuit element or device. Technically, the cathode is the terminal through which the physical electrons flow into the device. The anode is the terminal through which the physical electrons flow out of the device. As a practical matter the anode refers to: 1) the positive terminal of a power consuming electrical circuit element; 2) the negative terminal of a discharging battery or an electrical power source; and, 3) the positive terminal of a charging battery. As a further practical matter the cathode refers to: 1) the negative terminal of a power consuming electrical circuit element; 2) the positive terminal of a discharging battery or an electrical power source; and, 3) the negative terminal of a charging battery.

Battery: As used in this disclosure, a battery is a chemical device consisting of one or more cells, in which chemical energy is converted into electricity and used as a source of power.

Diode: As used in this disclosure, a diode is a two terminal semiconductor device that allows current flow in only one direction. The two terminals are called the anode and the cathode. Electric current is allowed to pass from the anode to the cathode.

Field of Illumination: As used in this disclosure, a field of illumination refers to an area illuminated by electromagnetic radiation projected from an electrical device such as a lamp or transmission antenna.

Lamp: As used in this disclosure, a lamp is an electrical device that generates visible light to illuminate objects so they can be seen.

LED: As used in this disclosure, an LED is an acronym for a light emitting diode. A light emitting diode is a diode that is also a light source.

Light: As used in this disclosure, light refers electromagnetic radiation that is illuminating an area.

Limit Resistor: As used in this disclosure, a limit resistor is an electrical resistor that is used to limit the flow of electric current through an electrical circuit.

Pull-Up Resistor: As used in this disclosure, a pull-up resistor is an electrical resistor used to: 1) limit the current flow through a switching device; and, 2) to control the voltage level presented across a load resistor or a pull-down resistor.

Resistor: As used in this disclosure, a resistor is a well-known and commonly available electrical device that inhibits the flow of electricity through an electric circuit. Within an electric circuit processing alternating currents, the resistor will not affect the phase of the alternating current. A current flowing through a resistor will create a voltage across the terminals of the resistor.

Timing Circuit: As used in this disclosure, a timing circuit refers to an electrical network of interconnected electrical elements, potentially including but not limited to, resistors, capacitors, diodes, transistors, and integrated circuit devices. The purpose of the timing circuit is to generate an electrical control signal after a predetermined amount of time. In common usage, a timing circuit is also referred to as timing circuitry. The "555" timing circuit is a well-known, documented, and commercially available timing circuit.

Tractor: As used in this disclosure, a tractor is a vehicle having a cab but no body and a powerful diesel or gasoline powered engine that is used to pull one or more trailers.

Trailer: As used in this disclosure, a trailer is an unpowered wheeled vehicle that is towed by a powered vehicle such as a tractor.

Transistor: As used in this disclosure, a transistor is a general term for a three-terminal semiconducting electrical device used for electrical signal amplification and electrical switching applications. There are several designs of transistors. A common example of a transistor is an NPN transistor that further comprises a collector terminal, an emitter terminal, and a base terminal and which consists of a combination of two rectifying junctions (a diode is an example of a rectifying junction). Current flowing from the collector terminal through the emitter terminal crosses the two rectifier junctions. The amount of the electric current crossing the two rectified junctions is controlled by the amount of electric current that flows through the base terminal.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A clearance light for a trailer comprising:
a left illumination circuit and a right illumination circuit;
wherein the left illumination circuit operates a left lamp that generates a left field of illumination on the left side of the tractor;
wherein the right illumination circuit operates a right lamp that generates a right field of illumination on the right side of the tractor;
wherein the clearance light for a trailer is an illumination system;
wherein the clearance light for a trailer is configured for use with a trailer;
wherein the trailer further comprises a left turn lamp and a right turn lamp;
wherein the trailer is further defined with a left side and a right side;
wherein the trailer is configured for use with a tractor;
wherein the tractor further comprises an electrical power system, a left turn control signal, and a right turn control signal;
wherein the operation of the left illumination circuit is initiated by the left turn control signal;

wherein the operation of the right illumination circuit is initiated by the right turn control signal;
wherein the left illumination circuit is an electrical circuit;
wherein the left illumination circuit operates a left lamp;
wherein the left lamp generates a left field of illumination on the left side of the trailer when the left turn lamp is in operation;
wherein the right illumination circuit is an electrical circuit;
wherein the right illumination circuit operates a right lamp;
wherein the right lamp generates a right field of illumination on the right side of the trailer when the right turn lamp is in operation;
wherein the left illumination circuit is a self-contained device that attaches to the left side of the trailer;
wherein the left illumination circuit receives electrical power from the electrical power system of the tractor;
wherein the right illumination circuit is a self-contained device that attaches to the right side of the trailer;
wherein the right illumination circuit receives electrical power from the electrical power system of the tractor;
wherein the left illumination circuit comprises a left timing circuit, a left transistor, a left pull-up resistor, a left limit resistor, the left lamp, and a left electric ground;
wherein the left timing circuit, the left transistor, the left pull-up resistor, the left limit resistor, the left lamp, and the left electric ground are electrically interconnected;
wherein the left transistor is further defined with a left collector, a left emitter, and a left base.

2. The clearance light for a trailer according to claim 1
wherein the left timing circuit is a timing circuit;
wherein the left timing circuit is an electrical circuit that generates an electrical control signal in response to the detection of a triggering signal;
wherein the left timing circuit is triggered by the left turn control signal;
wherein the left timing circuit generates an electrical voltage that feeds electric current into the left base of the left transistor for a previously determined amount of time.

3. The clearance light for a trailer according to claim 2
wherein the left transistor operates as a switch;
wherein when a voltage is applied to the left base the left transistor acts as a closed switch allowing current to flow from the left collector to the left emitter;
wherein when the voltage is removed from the left base the left transistor acts as an open switch disrupting current flow from the left collector to the left emitter;
wherein the left transistor draws power from the electrical power system of the tractor through the left collector.

4. The clearance light for a trailer according to claim 3
wherein the left pull-up resistor connects in series between the electrical power system of the tractor and the left collector;
wherein the left pull-up resistor limits the flow of electricity from the electrical power system of the tractor into the left collector of the left transistor;
wherein the left limit resistor is a resistor placed in series between the left timing circuit and the left base of the left transistor;
wherein the left limit resistor limits the flow of electricity from the left timing circuit into the left base of the left transistor.

5. The clearance light for a trailer according to claim 4
wherein the left lamp is a two-terminal electrical device that generates light;
wherein the left lamp is configured to project light along the left side of the trailer.

6. The clearance light for a trailer according to claim 5
wherein the left lamp comprises one or more light emitting diodes;
wherein the left lamp is further defined with a left anode and a left cathode;
wherein the left anode of the left lamp electrically connects to the left emitter of the left transistor;
wherein the left cathode of the left lamp electrically connects to the left electric ground;
wherein the left electric ground is electrically connected to the electrical ground of the electrical power system of the tractor.

7. The clearance light for a trailer according to claim 6
wherein the right illumination circuit comprises a right timing circuit, a right transistor, a right pull-up resistor, a right limit resistor, the right lamp, and a right electric ground;
wherein the right timing circuit, the right transistor, the right pull-up resistor, the right limit resistor, the right lamp, and the right electric ground are electrically interconnected;
wherein the right transistor is further defined with a right collector, a right emitter, and a right base.

8. The clearance light for a trailer according to claim 7
wherein the right timing circuit is a timing circuit;
wherein the right timing circuit is an electrical circuit that generates an electrical control signal in response to the detection of a triggering signal;
wherein the right timing circuit is triggered by the right turn control signal;
wherein the right timing circuit generates an electrical voltage that feeds electric current into the right base of the right transistor for a previously determined amount of time.

9. The clearance light for a trailer according to claim 8
wherein the right transistor operates as a switch;
wherein when a voltage is applied to the right base the right transistor acts as a closed switch allowing current to flow from the right collector to the right emitter;
wherein when the voltage is removed from the right base the right transistor acts as an open switch disrupting current flow from the right collector to the right emitter;
wherein the right transistor draws power from the electrical power system of the tractor through the right collector.

10. The clearance light for a trailer according to claim 9
wherein the right pull-up resistor connects in series between the electrical power system of the tractor and the right collector;
wherein the right pull-up resistor limits the flow of electricity from the electrical power system of the tractor into the right collector of the right transistor;
wherein the right limit resistor is a resistor placed in series between the right timing circuit and the right base of the right transistor;
wherein the right limit resistor limits the flow of electricity from the right timing circuit into the right base of the right transistor.

11. The clearance light for a trailer according to claim 10
wherein the right lamp is a two-terminal electrical device that generates light;
wherein the right lamp is configured to project light along the right side of the trailer.

12. The clearance light for a trailer according to claim 11
wherein the right lamp comprises one or more light emitting diodes;
wherein the right lamp is further defined with a right anode and a right cathode;
wherein the right anode of the right lamp electrically connects to the right emitter of the right transistor;
wherein the right cathode of the right lamp electrically connects to the right electric ground;
wherein the right electric ground is electrically connected to the electrical ground of the electrical power system of the tractor.

13. The clearance light for a trailer according to claim 1
wherein the left illumination circuit comprises a left timing circuit, a left transistor, a left pull-up resistor, a left limit resistor, the left lamp, and a left electric ground;
wherein the right illumination circuit comprises a right timing circuit, a right transistor, a right pull-up resistor, a right limit resistor, the right lamp, and a right electric ground;
wherein the left timing circuit, the left transistor, the left pull-up resistor, the left limit resistor, the left lamp, and the left electric ground are electrically interconnected;
wherein the right timing circuit, the right transistor, the right pull-up resistor, the right limit resistor, the right lamp, and the right electric ground are electrically interconnected;
wherein the left transistor is further defined with a left collector, a left emitter, and a left base;
wherein the right transistor is further defined with a right collector, a right emitter, and a right base.

14. The clearance light for a trailer according to claim 13
wherein the left timing circuit is a timing circuit;
wherein the right timing circuit is a timing circuit;
wherein the left timing circuit is an electrical circuit that generates an electrical control signal in response to the detection of a triggering signal;
wherein the right timing circuit is an electrical circuit that generates an electrical control signal in response to the detection of a triggering signal;
wherein the left timing circuit is triggered by the left turn control signal;
wherein the right timing circuit is triggered by the right turn control signal;
wherein the left timing circuit generates an electrical voltage that feeds electric current into the left base of the left transistor for a previously determined amount of time;
wherein the right timing circuit generates an electrical voltage that feeds electric current into the right base of the right transistor for a previously determined amount of time.

15. The clearance light for a trailer according to claim 14
wherein the left transistor operates as a switch;
wherein the right transistor operates as a switch;
wherein when a voltage is applied to the left base the left transistor acts as a closed switch allowing current to flow from the left collector to the left emitter;
wherein when a voltage is applied to the right base the right transistor acts as a closed switch allowing current to flow from the right collector to the right emitter;
wherein when the voltage is removed from the right base the right transistor acts as an open switch disrupting current flow from the right collector to the right emitter;
wherein when the voltage is removed from the left base the left transistor acts as an open switch disrupting current flow from the left collector to the left emitter;
wherein the left transistor draws power from the electrical power system of the tractor through the left collector;
wherein the right transistor draws power from the electrical power system of the tractor through the right collector.

16. The clearance light for a trailer according to claim 15
wherein the left pull-up resistor connects in series between the electrical power system of the tractor and the left collector;
wherein the right pull-up resistor connects in series between the electrical power system of the tractor and the right collector;
wherein the left pull-up resistor limits the flow of electricity from the electrical power system of the tractor into the left collector of the left transistor;
wherein the right pull-up resistor limits the flow of electricity from the electrical power system of the tractor into the right collector of the right transistor;
wherein the left limit resistor is a resistor placed in series between the left timing circuit and the left base of the left transistor;
wherein the right limit resistor is a resistor placed in series between the right timing circuit and the right base of the right transistor;
wherein the left limit resistor limits the flow of electricity from the left timing circuit into the left base of the left transistor;
wherein the right limit resistor limits the flow of electricity from the right timing circuit into the right base of the right transistor.

17. The clearance light for a trailer according to claim 16
wherein the left lamp comprises one or more light emitting diodes;
wherein the right lamp comprises one or more light emitting diodes;
wherein the left lamp is further defined with a left anode and a left cathode;
wherein the right lamp is further defined with a right anode and a right cathode;
wherein the left anode of the left lamp electrically connects to the left emitter of the left transistor;
wherein the right anode of the right lamp electrically connects to the right emitter of the right transistor;
wherein the left cathode of the left lamp electrically connects to the left electric ground;
wherein the right cathode of the right lamp electrically connects to the right electric ground;
wherein the left electric ground is electrically connected to the electrical ground of the electrical power system of the tractor;
wherein the right electric ground is electrically connected to the electrical ground of the electrical power system of the tractor.

* * * * *